United States Patent Office 3,332,951
Patented July 25, 1967

3,332,951
N-SUBSTITUTED BENZO-AZACYCLOALKENES
Alberto Pietro Arnoldo Rossi, Oberwil, Basel-Land, Switzerland, and Lincoln Harvey Werner, Summit, William Laszlo Bencze, New Providence, and George de Stevens, Woodland Park, Summit, N.J., assignors to Ciba Corporation, New York, N.Y., a corporation of Delaware
No Drawing. Filed June 10, 1964, Ser. No. 374,138
10 Claims. (Cl. 260—286)

This is a continuation-in-part of application Ser. No. 321,327, filed Nov. 4, 1963, which in turn is a continuation-in-part of application Ser. No. 244,552, filed Dec. 14, 1962 (now abandoned).

The present invention concerns N-substituted benzoazacycloalkene compounds. More particularly, it is related to 1-(R-methyl)-benzoazacycloalkenes, in which the azacycloalkene portion has from six to eight ring members and its aza-nitrogen represents the 1-position of the benzoazacycloalkene ring system, and R is a 2-(1,3-diaza-2-cycloalkenyl) radical having from five to seven ring members, and in which one of the positions 2 and 3 of the azacycloalkene portion is substituted by Ar representing an aryl group, or salts thereof, as well as process for the preparation of such compounds.

More especially, it relates to compounds having one of the following formulae

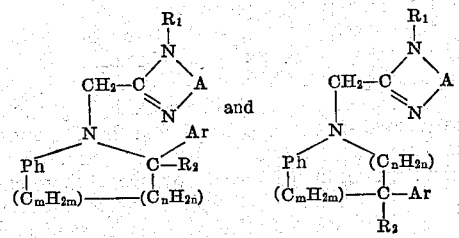

in which Ph is a 1,2-phenylene (or o-phenylene) radical, Ar is an aryl radical, each of the groups $R_1$ and $R_2$ is hydrogen or lower alkyl, the group having the formula $-(C_mH_{2m})-$ is lower alkylene separating the group Ph from the group of the formula $-(C_nH_{2n})-$ or from the carbon atom carrying the groups Ar and $R_2$, respectively, by at most three carbon atoms, the group of the formula $-(C_nH_{2n})-$ is lower alkylene, separating the carbon atom carrying the groups Ar and $R_2$ from the group of the formula $-(C_mH_{2m})-$ or from the ring-nitrogen atom, respectively, by one carbon atom, and A is lower alkylene separating the two nitrogen atoms by two to four carbon atoms, and the salts thereof.

The benzo portion of the benzocycloalkene ring system, especially the 1,2-phenylene radical Ph, is unsubstituted or substituted, in which case it may have one or more than one of the same or of different substituents attached to any of the positions available for substitution. Such substituents are, for example, aliphatic substituents, such as lower alkyl, e.g. methyl, ethyl, n-propyl, isopropyl, n-butyl, isobutyl, secondary butyl, tertiary butyl and the like, etherified hydroxyl, particularly lower alkoxy, e.g. methoxy, ethoxy, n-propyloxy, isopropyloxy and the like, as well as lower alkenyloxy, e.g. allyloxy and the like, lower alkylenedioxy, e.g. methylenedioxy, 1,1-ethylenedioxy and the like, or any other etherified hydroxyl group, esterified hydroxyl, such as halogeno (representing hydroxyl esterified by a hydrohalic acid), e.g. fluoro, chloro, bromo and the like, etherified mercapto, such as lower alkyl-mercapto, e.g. methylmercapto, ethylmercapto, n-propylmercapto, isopropylmercapto and the like, acyl, such as lower alkanoyl, e.g. acetyl, propionyl, n-butyryl, pivalyl and the like, polyfluoro-lower alkyl, e.g. trifluoromethyl, 1,1,2,2,2-pentafluoroethyl and the like, as well as nitro, amino or substituted amino, such as N.N-di-lower alkyl-amino, e.g. N,N-dimethylamino, N,N-diethylamino and the like, or any other suitable substituent.

A substituted benzo portion of the N-benzoazacycloalkene radical, especially a substituted 1,2-phenylene group Ph in the above formula, is particularly a (lower alkyl)-benzo portion, especially a (lower alkyl)-1,2-phenylene radical, an (etherified hydroxy)-benzo portion, especially an (etherified hydroxy)-1,2-phenylene radical, particularly a (lower alkoxy)-benzo portion, especially a (lower alkoxy)-1,2-phenylene radical, a (lower alkenyloxy)-benzo portion, especially a (lower alkenyloxy)-1,2-phenylene radical, or a (lower alkylenedioxy)-benzo portion, especially a (lower alkylenedioxy)-1,2-phenylene radical, an (esterified hydroxy)-benzo portion, especially an (esterified hydroxy)-1,2-phenylene radical, such as a (halogeno)-benzo portion, especially a (halogeno)-1,2-phenylene radical, an (etherified mercapto)-benzo portion, especially an (etherified mercapto)-1,2-phenylene radical, such as a (lower alkyl-mercapto)-benzo portion, especially a (lower alkyl-mercapto)-1,2-phenylene radical, an (acyl)-benzo portion, especially an (acyl)-1,2-phenylene radical, such as a (lower alkanoyl) - benzo portion, especially a (lower alkanoyl) - 1,2 - phenylene radical, a (polyfluoro - lower alkyl) - benzo portion, especially a (polyfluoro-lower alkyl)-1,2-phenylene radical, or any other substituted benzo portion, especially substituted 1,2-phenylene radical.

The azacycloalkene portion has from six to eight ring members. In the above formula, the group of the formula $-(C_mH_{2m})-$ is lower alkylene radical having preferably from one to four carbon atoms (the letter $m$ stands preferably for an integer from 1 to 4), and separating the 1,2-phenylene group Ph from the group of the formula $-(C_nH_{2n})-$ or from the carbon atom carrying the groups Ar and $R_2$, respectively, by at most three carbon atoms. A lower alkylene radical represented by the group of the formula $-(C_mH_{2m})-$, is, for example, methylene, 1,1 - ethylene, 1,2-ethylene, 1-methyl - 1,2-ethylene, 2-methyl-1,2-ethylene, 1,3-propylene, 1-methyl-1,3-propylene, 2,3-butylene and the like.

The group of the formula $-(C_nH_{2n})-$ in the above formula is lower alkylene having preferably from one to four carbon atoms (the letter $n$ stands for an integer from 1 to 4), and separating the carbon atom carrying the groups Ar and $R_2$ by one carbon atom from the group of the formula $-(C_mH_{2m})-$ or from the ring-nitrogen atom, respectively. A lower alkylene radical represented by the group of the formula $-(C_nH_{2n})-$ is above all methylene, as well as 1,1-ethylene, 2,2-propylene, 1,1-butylene and the like.

As mentioned, the 2-position or the 3-position of the benzoazacycloalkenyl portion of the present compounds is substituted by an aryl radical, especially a carbocyclic aryl or a heterocyclic aryl radical, represented in the above formula by the group Ar. A carbocyclic aryl radical is above all a monocyclic carbocyclic aryl group, i.e. phenyl or substituted phenyl, as well as a bicyclic carbocyclic aryl group, i.e. naphthyl, e.g. 1-naphthyl or 2-naphthyl, or substituted naphthyl. The substituted phenyl or naphthyl groups have one or more than one of the same or of different substituents, which may be attached to any one of the positions available for substitution. Such substituents are, for example, lower alkyl, e.g. methyl, ethyl, n-propyl, isopropyl, n-butyl and the like, lower alkoxy, e.g. methoxy, ethoxy, n-propyloxy, isopropyloxy and the like, or halogeno, e.g. fluoro, chloro, bromo and the like, as well as nitro, amino, N-lower alkyl-amino, e.g. N-methylamino, N-ethylamino and the like, N,N-di-lower alkylamino, e.g. N,N-dimethylamino, N-ethyl-N-methylamino, N,N-diethylamino and the like, N-acylamino, particularly N-lower alkanoylamino, e.g. N-acetylamino, N-propionylamino and the like, polyfluoro-lower alkyl, e.g. trifluoromethyl and the like, or any other suitable substituent. A substituted phenyl radical is more especially (lower alkyl)-phenyl, (lower alkoxy)-phenyl, or (halogeno)-phenyl, as well as (nitro)-phenyl, (amino)-phenyl, (N-lower alkyl-amino)-phenyl, (N,N-di-lower alkyl-amino)-phenyl, (N-lower alkanoyl-amino)-phenyl, (polyfluoro-lower alkyl)-phenyl and the like; substituted naphthyl is, for example, (lower alkyl)-naphthyl, (lower alkoxy)-naphthyl or (halogeno)-naphthyl, as well as (nitro)-naphthyl, (amino)-naphthyl, (N-lower alkyl - amino)-naphthyl, (N,N - di - lower alkyl-amino)-naphthyl, (N-lower alkanoyl-amino)-naphthyl, polyfluoro-lower alkyl)-naphthyl and the like.

A heterocyclic aryl radical representing the group Ar is preferably a monocyclic heterocyclic aryl radical, such as a monocyclic azacyclic aryl radical, above all pyridyl, e.g. 3-pyridyl, 4-pyridyl and the like, as well as a monocyclic thiacyclic aryl radical, such as thienyl, e.g. 2-thienyl and the like, or a monocyclic oxacyclic aryl radical, such as furyl, e.g. 2-furyl and the like, or any other heterocyclic aryl radical.

Optionally, the 2-position or the 3-position of the benzoazacycloalkene ring system carrying the aryl group Ar may be substituted by lower alkyl as an additional substituent. In the above formula, the group $R_2$ is above all hydrogen, but may also be lower alkyl, e.g. methyl, ethyl, n-propyl, isopropyl and the like.

The 2-(1,3-diaza-2-cycloalkenyl) radical R having from five to seven ring members, which is represented in the above structural formula by the group having the partial formula

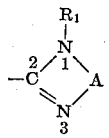

more particularly a 2-imidazolin-2-yl radical, but may also be a 2-(1,4,5,6-tetrahydro-pyrimidyl)-radical or a (1,3-diaza-2-cycloheptenyl) radical. The carbon atoms of the 2-(1,3-aza-2-cycloalkenyl) radical, available for substitution, may be unsubstituted or may be substituted, especially by lower alkyl, e.g. methyl, ethyl, n-propyl, isopropyl, n-butyl, tertiary butyl and the like, or any other suitable substituent. One of the azanitrogens carries a hydrogen atom, which, if desired, may be replaced by lower alkyl, e.g. methyl, ethyl, n-propyl, isopropyl, n-butyl, secondary butyl, tertiary butyl and the like.

Thus, in the above partial formula, the group A stands for lower alkylene separating the two nitrogen atoms by from two to four carbon atoms, which may be unsubstituted or substituted, especially by lower alkyl; A is above all represented by 1,2-ethylene, but may also be 1-methyl-1,2-ethylene, 2-methyl-1,2-ethylene, 1,1-dimethyl-1,2-ethylene, 1,2-dimethyl-1,2-ethylene, 1-ethyl-1,2-ethylene, 1-isopropyl-1,2-ethylene, 1,3-propylene, 1-methyl-1,3-propylene, 2-methyl-1,3-propylene, 1,2-dimethyl-1,3-propylene, 2,2-dimethyl-1,3-propylene, 1,3-dimethyl-1,3-propylene, 1-ethyl-1,3-propylene, 2-isopropyl-1,3-propylene, 1,4-butylene, 1-methyl-1,4-butylene, 1,2-dimethyl-1,4-butylene, 1-n-propyl-1,4-butylene and the like, whereas the group $R_1$ is hydrogen, as well as lower alkyl.

Salts of the compounds of this invention are acid addition salts, such as the pharmaceutically acceptable, non-toxic acid addition salts with inorganic acids, e.g. hydrochloric, hydrobromic, sulfuric, phosphoric acids and the like, or with organic acids, such as organic carboxylic acids, e.g. formic, acetic, propionic, glycolic, malonic, succinic, lactic, maleic, hydroxymaleic, fumaric, malic, tartaric, citric, glucuronic, benzoic, cinnamic, salicylic, aminosalicylic, 2-phenoxybenzoic, 2-acetoxybenzoic, manodelic, nicotinic, isonicotinic acid and the like, organic sulfonic acids, e.g. methane sulfonic, ethane sulfonic, 2- hydroxyethane sulfonic, ethane 1,2-disulfonic, benzene sulfonic, p-toluene sulfonic, naphthalene 2-sulfonic acid and the like, or acid organic phosphates, e.g. adenosine 3- or 5-monophosphate, -diphosphate or -triphosphate and the like. Other acid addition salts may be used as intermediates, for example, in the purification of the free compounds or in the preparation of other, for example, pharmaceutically acceptable, acid addition salts, or for identification and characterization purposes. Acid addition salts, which are primarily used for the latter are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The new compounds of this invention have antifibrillatory properties and are, therefore, useful in the treatment of heart irregularities, such as fibrillation, for example, neurogenic or cardiogenic, auricular or ventricular fibrillation. The antifibrillatory properties exhibited by the compounds of this invention are of prolonged duration.

Outstanding antifibrillatory properties are exhibited by compounds having one of the following formulae

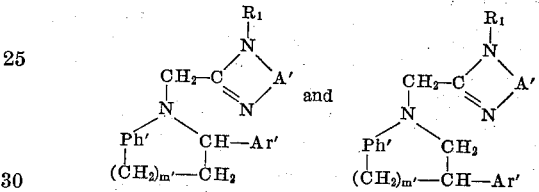

in which the group Ph' is above all 1,2-phenylene, as well as (lower alkyl)-1,2-phenylene, (lower alkoxy)-1,2-phenylene, (halogeno)-1,2-phenylene or (trifluoromethyl)-1,2-phenylene, the group Ar' is primarily phenyl or (halogeno)-phenyl, as well as (lower alkyl)-phenyl, (lower alkoxy)-phenyl or (trifluoromethyl)-phenyl, the letter $m'$ is one of the integers 1 and 2, A' stands for alkylene having from two to three carbon atoms and separating the two nitrogen atoms by two to three carbon atoms, and $R_1$ is primarily hydrogen, as well as lower alkyl, and acid addition salts, particularly pharmaceutically acceptable, non-toxic acid addition salts, thereof.

The compounds of this invention are useful in the form of compositions for enternal, e.g. oral, or parenteral use, which consists essentially of a pharmacologically effective amount of one of the new compounds of this invention as the pharmacologically active ingredient together with a pharmaceutically acceptable organic or inorganic, solid or liquid carrier. For making up these compositions, there are employed substances which do not react with the new compounds, such as water, gelatin, lactose, sucrose, starches, stearic acid, magnesium stearate, calcium stearate, talc, vegetable oils, benzyl alcohol, stearyl alcohol, gums, acacia, tragacanth, propylene glycol, polyalkylene glycol or any other carrier suitable for making up such compositions. The latter may be in solid form, for example, as capsules, tablets, dragees and the like, or in liquid form, for example, as solutions, suspensions, emulsions and the like. If desired, they may contain auxiliary substances, such as preserving, stabilizing, wetting emulsifying, coloring, flavoring agents and the like, salts for varying the osmotic pressure, buffers, etc. They may also contain, in combination, other useful substances.

The compounds of the present invention are prepared according to known methods. For example, a benzoazacycloalkene compound, in which the azacycloalkene portion has from six to eight ring members and its azanitrogen represents the 1-position of the benzoazacycloalkene ring system, and in which one of the positions 2 and 3 of the azacycloalkene portion is substituted by Ar having the previously-given meaning, or a salt thereof, may be treated with a reactive esterfied R-methanol, in which R is a 2-(1,3-diaza-2-cycloalkenyl) radical, or a salt thereof, and, if desired, a resulting salt may be converted into the free compound or into another salt, and/or, if desired, a hydrogen attached to one of the azanitrogen atoms of the 2-(1,3-diaza-2-cycloalkenyl) radical in a resulting compound may be replaced by lower alkyl, and/or, if desired, a free compound may be converted into a salt thereof.

Salts of the benzoazacycloalkene starting materials used in the above procedure are metal salts, particularly the alkali metal, e.g. lithium, sodium or potassium, salts, as well as the alkaline earth metal salts thereof, or other salts, such as those formed with strong ammonium bases, for example, benzyl trimethyl ammonium hydroxide and the like. These salts are prepared according to known methods, for example, by reacting the free starting material with a metal, particularly an alkali metal, or, more especially with an alkali metal hydride, amide or lower alcoholate, e.g. methanolate, ethanolate, tertiary butanolate and the like, in the presence of an appropriate diluent. These salts of the starting material are preferably used with the free reactive ester of the R-methanol.

The reactive esterified R-methanols used as the reagents in the above reaction are, for example, the esters of such methanol compounds with strong inorganic acids, such as mineral acids, for example, hydrohalic acids, e.g. hydrochloric, hydrobromic, hydriodic acid, or sulfuric acid, or with strong organic acids, particularly strong organic sulfonic acids, such as lower alkane sulfonic acids or monocyclic carbocyclic aryl sulfonic acids, e.g. methane sulfonic, ethane sulfonic, 2-hydroxy-ethane sulfonic, p-toluene sulfonic acid and the like. Salts of the reactive esters of R-methanols are addition salts with acids, such as those mentioned before, particularly those with hydrohalic acids. These acid addition salts are preferably used with the free benzoazacycloalkene starting material, but may also be employed with a salt of the latter, if the reagent for the formation of such salts is used in excess amounts to liberate the free compound from the acid.

The reaction is carried out in the presence of a diluent, the selection of which depends on the properties of the reagents; thus, lower alkanols, e.g. methanol, ethanol and the like, may be used with the free benzoazacycloalkene starting material, whereas a salt of the latter may be reacted in the presence of an inert solvent, such as ether, e.g. diethyl ether, p-dioxane, tetrahydrofuran and the like, hydrocarbons, e.g. hexane, cyclohexane, benzene, toluene and the like, N,N-disubstituted amides, e.g. N,N-dimethylformamide and the like, or any suitable diluent or solvent mixture. If necessary, the reaction may be carried out while cooling or at an elevated temperature, in a closed vessel and/or in the atmosphere of an inert gas, e.g. nitrogen.

The starting materials used in the above procedure are known or are prepared according to known methods. For example, 2-Ar-benzoazacycloalkenes are obtained by reducing nitro in an (o-nitro-monocyclic carbocyclic aryl)-alkyl Ar-ketone, in which the monocyclic carbocyclic aryl group is separated from the carbonyl group by two to four carbon atoms (for example, with catalytically activated hydrogen, nascent hydrogen and the like), and if necessary, ring-closing the resulting amino compound (for example, by treatment with an alkali metal lower alkoxide), and/or reducing the Schiff base —C=N— double bond (for example, with an alkali metal borohydride). The 3-Ar-benzoazacycloalkenes are obtained by ring-closure of the carboxylic acid halide of an (o-amino-monocyclic carbocyclic aryl)-alkane carboxylic acid, in which the alkyl portion separates the carboxyl group from the monocyclic carbocyclic aryl portion by from two to four carbon atoms, and its α-carbon atom is substituted by the group Ar and conversion of the carbonyl portion of the amide grouping in a resulting compound into a methylene group by reduction, for example, by treatment with lithium aluminum hydride and the like. Furthermore, a 2-Ar-benzocycloalkenone, in which the carbonyl group is adjacent to the carbocyclic aryl portion, and the cycloalkenone portion has from five to seven ring members, is converted into the homoaza-compound by reacting it with hydrazoic acid according to the Schmidt reaction or by rearranging its hydroxyimino derivative according to the Beckmann rearrangement, and reducing the carbonyl portion of the amide grouping in a resulting compound to methylene.

The compounds of this invention may also be prepared for example, by converting in a 1-(reactive functionally converted carboxy - methyl) - benzoazacycloalkene compound, in which the azacycloalkene portion has from six to eight ring members and its azanitrogen represents the 1-position of the benzoazacycloalkene ring system, and in which one of the portions 2 and 3 of the azacycloalkene portion is substituted by Ar having the previously-given meaning, the reactive functionally converted carboxyl group into the group R having the previously-given meaning, and, if desired, carrying out the optional steps.

The reactive functionally converted carboxyl group in a 1-(reactive functionally converted carboxy-methyl)-benzoazacycloalkene starting material is above all a cyano group, as well as a imido-ether, an imido-thioether, an imido-halide, an amidino, an amido, a thioamido, an ester, or an acid halide group.

The conversion of the reactive functionally converted carboxyl group into the desired 2-(1,3-diaza-1-cycloalkenyl) radical is carried out according to known methods, for example, by reacting the starting material with a lower alkylene diamine in which the two amino groups are separated by two to four carbon atoms, or with a compound capable of being converted into said lower alkylene diamine compound by treatment with ammonia, or with a reactive N-substituted derivative of said lower alkylene diamine. The desired ring formation is carried out directly or in stages, if necessary, in the presence of a reactant. Furthermore, the process may be performed in such manner that a functional acid derivative is formed in the course of the reaction.

For example, whenever a 1-(cyano-methyl)-benzoazacycloalkene compound, representing the preferred starting material, is used and reacted directly with the lower alkylene-diamine or with a derivative thereof, it is of advantage to perform the reaction in the presence of hydrogen sulfide, carbon disulfide and the like; in such reaction, the diamine compound may be used in the form of a mono-salt or a poly-salt thereof.

Compounds capable of being converted into a lower alkylene-diamine by the reaction with ammonia, are, for example, the corresponding amino-lower alkanols or especially the esters thereof, as well as lower alkylene dihalides. Using these starting materials, the reaction is carried out in the presence of ammonia or an agent yielding ammonia.

The reactive N-substituted derivatives of the lower alkylene-diamines used as the reagents in the process, are ureas, such as, for example, ethylene urea, propylene urea and the like.

To carry out the procedure in stages, the 1-(reactive functionally converted carboxy - methyl) - benzoazacycloalkene compound is reacted with the lower alkylene-diamine to form the N-acyl compound, which is then ring-closed by elimination of water, for example, by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst, and/or condensing agent, if necessary, while cooling or at an elevated temperature, under increased pressure, and/or in the atomsphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, a benzoazacycloalkene compound or a salt thereof may be treated with a reactive esterified hydroxy-acetic acid or a functional acid derivative thereof; this reaction is carried out in a manner analogous to the one previously-described, involving treatment of a benzoazacycloalkene compound or a salt thereof with a reactive ester of an α-methanol. Furthermore, the preferred N-(cyano-methyl)-benzoazacycloalkene starting material may be obtained by treating a benzoazacycloalkene compound with formaldehyde or a reactive derivative thereof, such as paraformaldehyde in the presence of hydrocyanic acid or a salt thereof according to the Strecker synthesis. If desired, a free carboxyl group or a functionally converted carboxyl group, such as, for example, a cyano group, in a resulting compound may be converted into the desired reactive functionally converted carboxyl group according to methods known per se.

The 1-(reactive functionally converted carboxy-methyl)benzoazacyloalkenes, in which the azacycloalkene portion has from six to eight ring members and an azanitrogen represents the 1-position of teh benzoazacycloalkene ring system, and in which the position 2 or 3 of the azacycloalkene portion is substituted by Ar having the previously-given meaning, are new and are intended to be included within the scope of the invention. These intermediates are represented by the formulae

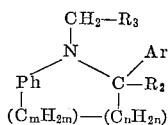

and

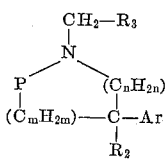

which Ph, Ar, R₂ and the groups of the formulae —(C_mH_{2m})— and —(C_nH_{2n})— have the previously-given meaning, and R₃ represents a reactive functionally converted carboxyl group, especially one of the groups of the following formulae:

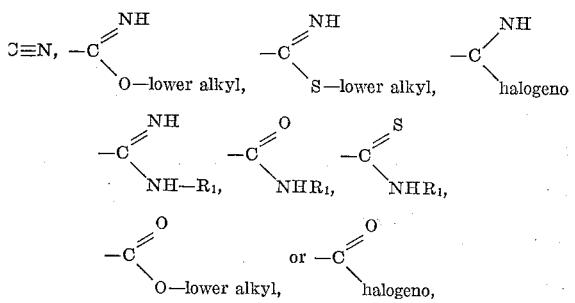

which halogeno stands primarily for chloro, as well bromo and the like, and R₁ has the above-given meaning, i.e. stands for hydrogen or lower alkyl. A preferred group of compounds is represented by the formulae

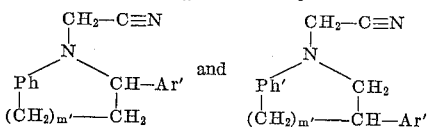

which Ph', Ar' and the letter m' have the previously-given meaning.

In a resulting compound, in which one of the nitrogen atoms of the 2-(1,3-diazo-2-cycloalkenyl) radical carries hydrogen, such hydrogen may be replaced by lower alkyl according to known methods; for example, a 1-(R-ethyl)-benzoazacycloalkene compound, in which R is an N-unsubstitutd 2-(1,3-diaza-2-cycloalkenyl) radical, or a salt thereof, such as an alkali metal salt thereof, may be reacted with a reactive ester of a lower alkanol, for example, a lower alkyl halide, e.g. methyl, ethyl, n-propyl or isopropyl chloride, bromide or iodide and the like.

A resulting salt may be converted into the free base, for example, by treatment with an alkaline reagent, such as a metal hydroxide, e.g. sodium hydroxide, potassium hydroxide, calcium hydroxide and the like, a metal carbonate, e.g. sodium, calcium or potassium carbonate or hydrogen carbonate and the like, ammonia or any other alkaline reagent, as well as a suitable hydroxyl ion exchange preparation, etc.

A resulting salt may be converted into another salt. For example, an inorganic acid addition salt, may be reacted with a suitable metal, e.g. sodium, barium, silver and the like, salt of an acid, in a diluent, in which a resulting inorganic salt is insoluble and is thus removed from the reaction mixture; an acid addition salt may also be treated with an anion exchange preparation and converted into another salt.

A free compound may be converted into an acid addition salt thereof by reacting it or a solution thereof in a suitable solvent or solvent mixture with an acid, such as one of those described before, or a solution thereof, or with a suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is(are) carried out, or the process is discontinued at any stage, or in which the starting materials are formed in the course of the reaction. Also included within the scope of the present invention are any new intermediates, such as, for example, those mentioned hereinbefore.

In the process of this invention, such starting materials are preferably used which lead to final products mentioned before as being the preferred embodiments.

The following examples are intended to illustrate the invention and are not to be construed as being limitations thereof. Temperatures are given in degrees centigrade.

*Example 1*

A mixture of 5.65 g. of 1-cyanomethyl-3-phenyl-2,3,4,5-tetrahydro-1-benzazepine, 1.7 g. of anhydrous ethylenediamine and three drops of carbon disulfide is heated for five hours at 130–135°, cooled and then diluted with 50 ml. of ethanol. The resulting solution is evaporated to dryness, the residue is dissolved in 50 ml. of ethyl acetate, the solution is treated with a charcoal preparation. On addition of a solution of hydrogen chloride in ethanol, the 1-(2-imidazolin-2-yl-methyl) - 3 - phenyl-2,3,4,5-tetrahydro-1-benzazepine hydrochloride precipitates, which is filtered off an ddissolved in 1,000 ml. of water. The solution is treated with a charcoal preparation, made alkaline with a 10 percent aqueous solution of sodium hydroxide, and extracted with methylene chloride. The organic phase is separated and evaporated to yield the crystalline 1-(2-imidazolin-2-yl-methyl) - 3 - phenyl-2,3,4,5-tetrahydro-1-benzazepine of the formula

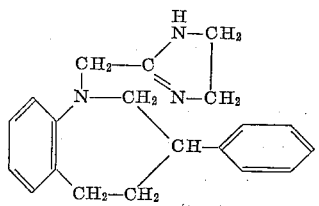

which melts at 117–118°, and is converted into its hydrochloride by reacting an ethanol solution with a saturated solution of hydrogen chloride in ethanol and dilute it with diethyl ether; the 1-(2-imidazolin-2-yl-methyl)-3- phenyl - 2,3,4,5 - tetrahydro-1-benzazepine hydrochloride melts at 280–283° after recrystallization from a mixture of methanol and diethyl ether.

The starting material used in the above procedure is prepared as follows: To a solution of 5.6 g. of 2-phenyl-1,2,3,4-tetrahydro-naphthalen-1-one in 30 ml. of acetic acid are slowly added 2.1 g. of sodium azide and, over a period of thirty minutes, 6 ml. of concentrated sulfuric acid, while maintaining a temperature of 40°. The latter is then raised to 50° and maintained for thirty minutes; the reaction mixture is kept at room temperature for an additional two hours and poured into 500 ml. of a 10 percent aqueous solution of sodium carbonate while cooling. The product is filtered off, washed with water and dissolved in a 1:1-mixture of ethyl acetate and methylene chloride; the solution is dried and evaporated to yield the 3-phenyl-2,3,4,5-tetrahydro-1-benzazepin-2-one, which melts at 196–198° after recrystallization from a mixture of ethanol and petroleum ether.

To a mixture of 6.5 g. of lithium aluminum hydride in 200 ml. of tetrahydrofuran is added gradually 10.0 g. of 3-phenyl-2,3,4,5-tetrahydro-1-benzazepin-2-one while stirring and maintaining a temperature of 60°. The reaction mixture is refluxed for four hours and is allowed to stand overnight at room temperature. After slowly adding 25 ml. of water while stirring, the reaction mixture is refluxed for one hour, cooled, filtered and concentrated to yield the desired 3-phenyl-2,3,4,5-tetrahydro-1-benzazepine which melts at 122–124° after recrystallization from a mixture of ethyl acetate and petroleum ether.

To 15 ml. of acetic acid are added in succession 5.3 g. of 3-phenyl-2,3,4,5-tetrahydro-1-benzazepine, 0.72 g. of paraformaldehyde and a solution of 1.4 g. of sodium cyanide in 5 ml. of water while stirring and maintaining a temperature of 15°. The reaction mixture is stirred for one hour at 15°, for one hour at 25° and eight hours at 50°, and is then cooled to 40° and treated with 1.1 ml. of a 37 percent aqueous solution of formaldehyde. After stirring for one hour, it is diluted with 20 ml. of water, the supernatant solution is decanted and the oily residue is dissolved in diethyl ether. The organic solution is washed with an aqueous solution of sodium hydrogen carbonate and with water, dried and concentrated. The residue is distilled to yield the desired 1-cyanomethyl-3-phenyl-2,3,4,5-tetrahydro-1-benzazepine of the formula

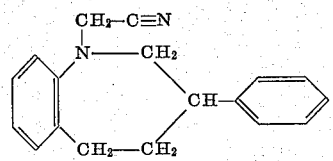

which is collected at 145–155°/0.1 mm.

The above starting material is also obtained by reacting 3-phenyl-2,3,4,5-tetrahydro-1-benzazepine in toluene with a suspension of sodium amide in toluene, and reacting the resulting sodium salt of 3-phenyl-2,3,4,5-tetrahydro-1-benzazepine with bromoacetonitrile; the resulting 1-cyanomethyl - 3 - phenyl-2,3,4,5-tetrahydro-1-benzazepine, which is purified by distillation, is collected at 145–155°/0.1 mm.

Example 2

A mixture of 6.9 g. of 1-cyanomethyl-3-phenyl-1,2,3,4-tetrahydro-quinoline, 252 g. of anhydrous ethylenediamine and three drops of carbon disulfide is heated to 130–140° for four hours. After cooling, 25 ml. of ethanol is added, thoroughly mixed with the crude reaction product and then removed. The same operation is repeated with 25 ml. of ethyl acetate, and the residue is then dissolved in ethanol while heating. The filtrate is treated with a concentrated solution of hydrogen chloride in ethyl acetate to precipitate the hydrochloride salt which is filtered off and dissolved in water. The aqueous solution is treated with sodium hydroxide in water, the resulting precipitate is filtered off and dissolved in ethyl acetate. The hydrochloride salt is again prepared by adding a saturated solution of hydrogen chloride in ethyl acetate. The precipitate is filtered off, dissolved in ethanol while warming, and the solution is diluted with diethyl ether to yield 3.3 g. of 1-(2-imidazolin-2-yl-methyl)-3-phenyl-1,2,3,4-tetrahydro-quinoline hydrochloride of the formula

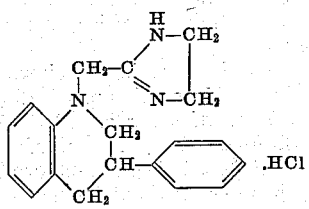

which melts at 290–294° after recrystallization from ethanol.

The starting material used in the above procedure is prepared as follows: To a solution of 7.5 g. of 3-phenyl-1,2,3,4-tetrahydro-quinoline in 16 ml. of glacial acetic acid is added 0.91 g. of paraformaldehyde and the reaction mixture is cooled to 15°. A solution of 1.77 g. of sodium cyanide in 6 ml. of water is added dropwise while stirring. The reaction mixture is stirred for one hour at room temperature, then heated to 45°, kept at that temperature for three hours and then cooled to 35°, whereupon 1.4 ml. of a 37 percent aqueous solution of formaldehyde is added. The temperature is raised to 37° and is then brought to room temperature. After adding 1.7 ml. of water, the organic material is extracted with 100 ml. of benzene, the benzene extract is washed with an aqueous solution of sodium hydrogen carbonate and with water, then dried and concentrated under reduced pressure. Upon adding ethyl acetate to the residue, the desired 1-cyanomethyl-3-phenyl-1,2,3,4-tetrahydro-quinoline of the formula

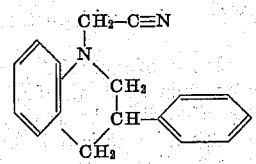

crystallizes (yield: 6.9 g.) and melts at 119–120° after recrystallization from a mixture of benzene and ethyl acetate.

Example 3

A mixture of 7.1 g. of 3-(2-chloro-phenyl)-1-cyanomethyl-2,3,4,5-tetrahydro-1-benzazepine, 2.2 g. of ethylenediamine and 7 drops of carbon disulfide is heated in an oil bath to 130–135° for three hours. After cooling, the reaction mixture is treated with ethanol and ethyl acetate as described in Example 2; the crude base is converted into its hydrochloride by adding a concentrated solution of hydrogen chloride in ethyl acetate; it is filtered off and extracted with about 100 ml. of isopropanol and the insoluble material is removed by filtration. The isopropanol solution is concentrated under reduced pressure; the residue is dissolved in water and the aqueous solution is treated with sodium hydroxide and extracted with ethyl acetate. The organic solution is dried and concentrated; on standing the 3-(2-chloro-phenyl)-1-(2-imidazolin-2-yl-methyl)-2,3,4,5-tetrahydro - 1 - benzazepine of the formula

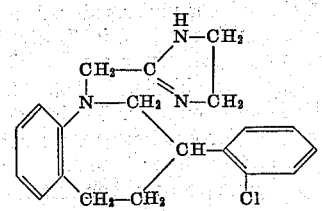

crystallizes; it melts at 117–118° after recrystallization from a mixture of ethyl acetate and hexane.

A solution of 3.5 g. of 3-(2-chloro-phenyl)-1-(2-imidazolin - 2 - yl - methyl) - 2,3,4,5 - tetrahydro - 1 - benzazepine in ethyl acetate, when treated with anhydrous hydrogen chloride, yields the 3-(2-chloro-phenyl)-1-(2-imidazolin - 2 - yl - methyl) - 2,3,4,5 - tetrahydro - 1-benzazepine hydrochloride which melts at 212° after recrystallization from a mixture of isopropanol and diethyl ether; yield: 2.7 g.

The starting material used in the above procedure is prepared as follows: To a mixture of 76 g. of sodium hydroxide in 660 ml. of water is added 420 ml. of 95 percent ethanol, followed by 180 g. of acetophenone. After cooling to 15–20°, 211 g. of 2-chloro-benzaldehyde is added with vigorous stirring. The latter is continued for three hours at room temperature. An oily layer separates which crystallizes on standing overnight while cooling; the resulting 2-chlorobenzal-acetophenone is filtered off, washed with water and recrystallized from ethanol, M.P. 50–52°; yield: 271 g.

A mixture of 121.4 g. of 2-chlorobenzal-acetophenone in 660 ml. of 95 percent ethanol, containing 30 g. of acetic acid, is heated to 55°, whereupon a solution of 65 g. of potassium cyanide in 135 ml. of water is added over a period of five minutes. The temperature is maintained at 55–60° for about 1½ hours. After cooling to 10°, the 2 - (2 - chloro - phenyl) - 4 - oxo - 4 - phenyl - butyronitrile crystallizes, is filtered off, washed with a 50 percent mixture of ethanol and water, and with water, and is recrystallized from ethanol, M.P. 104–107°; yield: 23 g.

A mixture of 100 g. of 2-(2-chloro-phenyl)-4-oxo-4-phenyl-butyronitrile in 600 ml. of methanol is stirred and then treated with 160 g. of concentrated sulfuric acid over a period of 2–5 minutes. The reaction mixture is refluxed for 2½ hours, then cooled in an ice-bath and filtered to yield 105 g. of methyl 2-(2-chloro-phenyl)-4-oxo-4-phenyl-butyrate, which is washed with methanol, M.P. 105–108°.

To a mixture of 258 g. of methyl 2-(2-chloro-phenyl)-4-oxo-4-phenyl-butyrate in 1550 ml. of methanol is added a solution of 72 g. of sodium hydroxide in 260 ml. of water, and the reaction mixture is refluxed for two hours while stirring. After cooling, it is neutralized with concentrated hydrochloric acid. The free 2-(2-chloro-phenyl)-4-oxo-4-phenyl-butyric acid precipitates, is filtered off and washed with water; it melts at 137–139° after recrystallized from ethanol, yield: 202.5 g.

A solution of 120 g. of 2-(2-chloro-phenyl)-4-oxo-4-phenyl-butyric acid in 1200 ml. of acetic acid is treated with hydrogen at about 7 atmospheres in the presence of 20 g. of a palladium catalyst (10 percent palladium on charcoal) while maintaining a temperature of 50–60°. The catalyst is filtered off, the filtrate is concentrated and the residue is taken up in diethyl ether. The organic solution is washed with water, dried and concentrated under reduced pressure; the residue is distilled under reduced pressure to yield the 2-(2-chloro-phenyl)-4-phenyl-butyric acid which is collected at 250°/0.05 mm.; yield: 77.2 g.

To a suspension of 44 g. of phosphorus pentachloride in 100 ml. of benzene is added a solution of 56 g. of 2-(2-chloro-phenyl)-4-phenyl-butyric acid in 100 ml. of benzene over a period of one hour while maintaining a temperature of 50°. The reaction mixture is then heated to 100° for thirty minutes and then concentrated under reduced pressure. Dilution with 100 ml. of benzene and evaporation of the solvent under reduced pressure is repeated twice; the resulting residue is dissolved in 150 ml. of benzene and is added slowly to a suspension of 30.4 g. of anhydrous aluminum chloride in 500 ml. of benzene over a period of thirty minutes. Stirring at room temperature is continued for two hours; the reaction mixture is then heated to 60° for three hours, and is allowed to stand at room temperature overnight. After the addition of ice and water, the organic material is extracted with diethyl ether; the organic solution is washed with an aqueous solution of sodium hydrogen carbonate and water, dried and concentrated. The residue is distilled and the 2-(2-chloro-phenyl)-1,2,3,4-tetrahydro-naphthalen-1-one is collected at 185–190°/0.7 mm.; yield: 50.0 g.

By treating a solution of 50.0 g. of 2-(2-chloro-phenyl)-1,2,3,4-tetrahydro-naphthalen-1-one in 250 ml. of glacial acetic acid with 16.5 g. of sodium azide and then with 50 ml. of concentrated sulfuric acid according to the procedure described in Example 1, 35.5 g. of 3-(2-chloro-phenyl)-2,3,4,5-tetrahydro-1-benzazepin-2-one is obtained, M.P. 240–242°.

By adding to a solution of 10.8 g. of lithium aluminum hydride in tetrahydrofuran a solution of 26.0 g. of 3-(2-chloro - phenyl) - 2,3,4,5 - tetrahydro - 1 - benzazepin - 2-one in tetrahydrofuran, using a total of 500 ml. of solvent, carrying out the reaction as described in Example 1, and decomposing the product with 44 ml. of ethyl acetate, 16 ml. of water, 32 ml. of a 15 percent aqueous solution of sodium hydroxide and 44 ml. of water, filtering off the solid material and concentrating the filtrate under reduced pressure, the crude 3-(2-chloro-phenyl)-2,3,4,5-tetrahydro-1-benzazepine is obtained which melts at 138–139° after repeated recrystallizations from hexane and acetone; yield: 6.0 g.

A mixture of 6.2 g. of 3-(2-chloro-phenyl)-2,3,4,5-tetrahydro-1-benzazepine, 15 ml. of glacial acetic acid, 0.72 g. of paraformaldehyde and a solution of 1.4 g. of sodium cyanide in 5 ml. of water is reacted as described in Example 1; the resulting product is extracted with benzene, organic solution is dried and evaporated under reduced pressure to yield 7.1 g. of the crude 3-(2-chlorophenyl) - 1 - cyanomethyl - 2,3,4,5 - tetrahydro - 1 - benzazepine of the formula

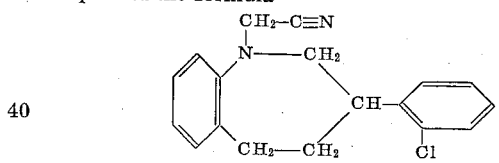

which is used directly without further purification.

*Example 4*

From a mixture of 8.9 g. of 3-phenyl-2,3,4,5-tetrahydro-1-benzazepine, 2.5 g. of 2-chloromethyl-2-imidazoline hydrochloride and 30 ml. of ethanol, the latter is slowly evaporated off and the residue is heated for 3 hours to 110–120°. After standing overnight, 50 ml. of water and about 100 ml. of diethyl ether are added to the reaction mixture, the remaining solids are filtered off and recrystallized from a mixture of methanol and diethyl ether to yield the 1-(2-imidazolin-2-yl-methyl)-3-phenyl-2,3,4,5-tetrahydro-1-benzazepine hydrochloride, which melts at 280–283°.

*Example 5*

A mixture of 4.3 g. of crude 8-chloro-1-cyanomethyl-3-phenyl-2,3,4,5-tetrahydro-1-benzazepine, 1.3 g. of ethylenediamine and three drops of carbon disulfide is heated to 130–135° for three hours. After cooling, the reaction mixture is treated with ethanol and ethyl acetate as described in Example 2; the resulting residue is dissolved in ethyl acetate and the hydrochloride salt is precipitated by adding a concentrated solution of dry hydrogen chloride in ethyl acetate, filtered off and dissolved in water; the free 8-chloro-1-(2-imidazolin-2-yl-methyl)-3-phenyl-2,3,4,5-tetrahydro-1-benzazepine of the formula

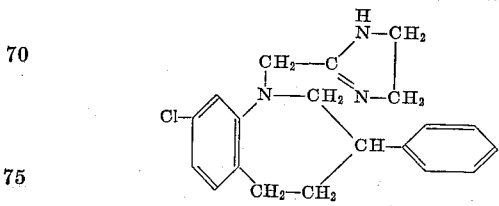

is liberated by treating the aqueous solution with sodium hydroxide and is extracted with ethyl acetate. A concentrated solution of dry hydrogen chloride in ethyl acetate is added, and the desired 8-chloro-1-(2-imidazolin-2-yl-methyl)-3-phenyl-2,3,4,5-tetrahydro-1-benzazepine hydrochloride crystallizes and is filtered off; it melts at 238° (with decomposition) recrystallized from isopropanol.

The starting material used in the above procedure is prepared as follows: By reacting 16.1 g. of 7-chloro-2-phenyl-1,2,3,4-tetrahydronaphthalen-1-one (M.P. 83–85°; prepared from 4-chloro-acetophenone and benzaldehyde according to the procedure described in Example 3) in 80.5 ml. of glacial acetic acid with 5.2 g. of sodium azide and 16.1 ml. of concentrated sulfuric acid according to the procedure described in Example 1, 6.8 g. of 8-chloro-3-phenyl-2,3,4,5-tetrahydro-1-benzazepin-2-one is obtained, M.P. 224–227°.

A total of 6.3 g. of 8-chloro-3-phenyl-2,3,4,5-tetrahydro-1-benzazepin-2-one is added to a mixture of 2.6 g. of lithium aluminum hydride in 150 ml. of tetrahydrofuran, and the reaction is carried out as described in Example 1. The resulting product is decomposed by adding 7.8 ml. of ethyl acetate, 2.6 ml. of water, 5.2 ml. of a 15 percent aqueous solution of sodium hydroxide and 7.8 ml. of water; the inorganic material is filtered off and the filtrate is concentrated to yield 4.4 g. of 8-chloro-3-phenyl-2,3,4,5-tetrahydro-1-benzazepine, which melts at 73–75° after recrystallization from hexane.

The reaction of 4.0 g. of 8-chloro-3-phenyl-2,3,4,5-tetrahydro-1-benzazepine in 10 ml. of glacial acetic acid with 0.5 g. of paraformaldehyde and a solution of 0.9 g. of sodium cyanide in 3.3 ml. of water according to the procedure described in Example 1 affords the formation of 4.3 g. of 8-chloro-1-cyanomethyl-3-phenyl-2,3,4,5-tetrahydro-1-benzazepine of the formula

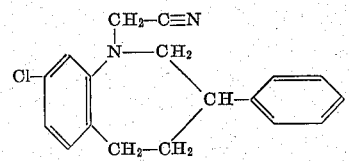

which melts at 103–104° after recrystallization from hexane.

Example 6

A mixture of 6.7 g. of 1-cyanomethyl-3-(4-methyl-phenyl)-2,3,4,5-tetrahydro-1-benzazepine, 2.2 g. of ethylenediamine and 7 drops of carbon disulfide is heated to 130–135° for three hours. After cooling, the reaction mixture is treated with ethanol and ethyl acetate as described in Example 2. The crude base is purified via the amorphous hydrochloride and the maleate, the base being liberated and extracted with ethyl acetate each time; 4.9 g. of the 1-(2-imidazolin-2-yl-methyl)-3-(4-methyl-phenyl)-2,3,4,5-tetrahydro-1-benzazepine of the formula

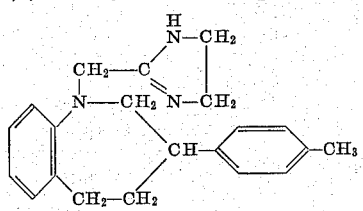

is obtained and redissolved in ethyl acetate. The organic solution is made weakly acidic by adding a concentrated solution of dry hydrogen chloride in ethyl acetate; on prolonged standing while cooling the desired 1-(2-imidazolin-2-yl-methyl)-3-(4-methyl-phenyl)-2,3,4,5-tetrahydro-1-benzazepine hydrochloride precipitates, which melts at 190–200° (with decomposition) after recrystallizations from a mixture of isopropanol, acetone and diethyl ether.

The starting material used in the above procedure is prepared as follows: A mixture of 49.3 g. of 2-(4-methyl-phenyl)-1,2,3,4-tetrahydro-naphthalen-1-one (M.P. 72–73°; prepared according to the procedure described by Ansell et al., J. Chem. Soc., p. 215 (1961)) in 246 ml. of glacial acetic acid is reacted with 17.7 g. of sodium azide and then with 49.3 ml. of concentrated sulfuric acid as described in Example 1, to yield 17.7 g. of 3-(4-methyl-phenyl)-2,3,4,5 - tetrahydro-1-benzazepin - 2-one, M.P. 193–194°.

To a mixture of 3.8 g. of lithium aluminum hydride in 200 ml. of dry tetrahydrofuran is added 8.8 g. of 3-(4-methyl-phenyl)-2,3,4,5 - tetrahydro - 1-benzazepin-2-one; the reaction is carried out as described in Example 1 and the resulting complex is decomposed by adding 11.4 ml. of ethyl acetate, 3.8 ml. of water, 7.6 ml. of a 15 percent aqueous solution of sodium hydroxide and 11.4 ml. of water. The inorganic precipitate is filtered off, the filtrate is concentrated and the residue is treated with hexane to yield 6.1 g. of 3-(4-methyl-phenyl)-2,3,4,5-tetrahydro-1-benzazepine, M.P. 76–78° after recrystallization from hexane.

A mixture of 5.6 g. of 3-(4-methyl-phenyl)-2,3,4,5-tetrahydro-1-benzazepine in 15 ml. of glacial acetic acid is treated with 0.72 g. of paraformaldehyde and then with a solution of 1.4 g. of sodium cyanide in 5 ml. of water; the reaction is performed as described in Example 1, and the organic material is extracted with benzene. The organic solution is evaporated to yield the desired 1-cyanomethyl-3-(4-methyl-phenyl) - 2,3,4,5 - tetrahydro-1-benzazepine of the formula

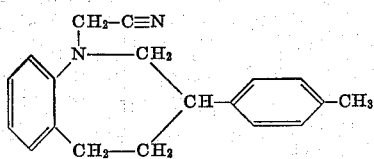

which is used in the next step without further purification.

Example 7

To a solution of 1.0 g. of 1-(2-imidazoline-2-yl-methyl)-3-phenyl-2,3,4,5-tetrahydro-1-benzazepine in 10 ml. of ethanol is added 1 ml. of methyl iodide. The reaction mixture is allowed to stand at room temperature for about 80 hours, and is then concentrated under reduced pressure. On treatment with acetone, the residue crystallizes and is filtered off; the desired 1-[(1-methyl-2-imidazolin-2-yl)-methyl]-3-phenyl - 2,3,4,5-tetrahydro-1-benzazepine hydriodide of the formula

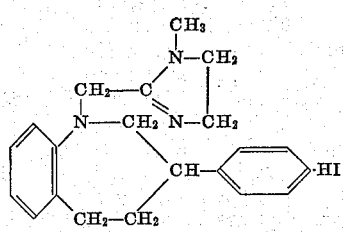

melts at 145° (with decomposition) after recrystallization from ethanol; yield: 0.4 g.

Example 8

A mixture of 5.2 g. of 1-cyanomethyl-3-phenyl-2,3,4,5-tetrahydro-1-benzazepine, 2.3 g. of 1,2-propylenediamine and three drops of carbon disulfide is heated to 140–150° for four hours. After cooling, the reaction product is dissolved in 25 ml. of ethanol and concentrated under reduced pressure; this operation is repeated with 25 ml. of ethyl acetate, and the residue is dissolved in ethyl acetate. The solution is filtered and concentrated, the residue is then treated with hexane and allowed to crystallize. The resulting 1-[(4-methyl - 2-imidazolin - 2-yl)-methyl]-3-phenyl-2,3,4,5-tetrahydro-1-benzazepine of the formula

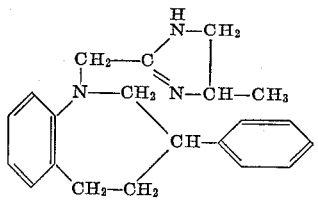

is filtered off and melts at 110–115°; yield: 5.6 g.

A solution of 4.6 g. of the above 1-[(4-methyl-2-imidazolin-2-yl)-methyl]-3-phenyl-2,3,4,5 - tetrahydro-1-benzazepine in ethyl acetate is treated with a concentrated solution of dry hydrogen chloride in ethyl acetate. The 1-[(4-methyl - 2 - imidazolin-2-yl) - methyl]-3-phenyl-2,3,4,5-tetrahydro-1-benzazepine hydrochloride precipitates and crystallizes slowly; it melts at 200–222° after two recrystallizations from a mixture of ethanol and ethyl acetate.

Example 9

A mixture of 5.2 g. of 1-cyanomethyl-3-phenyl-2,3,4,5-tetrahydro-1-benzazepine, 2.3 g. of 1,3-propylenediamine and three drops of carbon disulfide is heated to 120–140° for four hours. The reaction mixture is treated with ethanol and ethyl acetate as described in Example 8, and the resulting 3-phenyl-1-(1,4,5,6 - tetrahydro-2-pyrimidyl-methyl)-2,3,4,5-tetrahydro-1-benzazepine of the formula

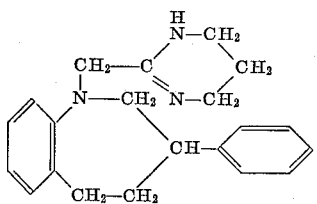

s crystallized from hexane, M.P. 124–128°; yield: 4.3 g.

A solution of 3.3 g. of the above 2-phenyl-1-(1,4,5,6-etrahydro-2-pyrimidyl - methyl) - 2,3,4,5-tetrahydro-1-ienzazepine in ethyl acetate, when treated with a concenrated solution of dry hydrogen chloride in ethyl aceate, yields the 3-phenyl-1-(1,4,5,6 - tetrahydro-2-pyrimiyl-methyl)-2,3,4,5-tetrahydro-1-benzazepine hydrochloide, which is allowed to crystallize, is filtered off and rerystallized from a mixture of ethanol and ethyl acetate, 1.P. 256–259°.

Example 10

A mixture of 4.5 g. of 3-(4-chloro-phenyl)-1-cyanoiethyl-2,3,4,5-tetrahydro-1-benzazepine, 1.35 g. of ethylnediamine and 3 drops of carbon disulfide is heated for ½ hours to 120–130°. After cooling, 25 ml. of ethanol added, the reaction mixture is stirred, and the solvent is vaporated under reduced pressure. After repeating this peration with 25 ml. of ethyl acetate, the residue is iken up in ethyl acetate and filtered, and the filtrate is eated with a concentrated solution of anhydrous hydro:n chloride in ethyl acetate. The precipitate is filtered ff and dissolved in water; the aqueous solution is made asic by adding sodium hydroxide and is extracted with hyl acetate. The organic solution is dried and evaporated ) yield 4.2 g. of the 3-(4-chloro-phenyl)-1-(2-imidazolin-yl-methyl)-2,3,4,5 - tetrahydro - 1-benzazepine of the rmula

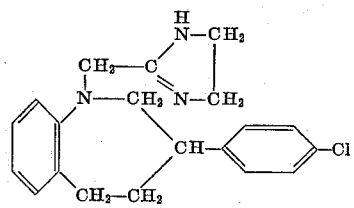

which is dissolved in ethyl acetate. The organic solution is treated with anhydrous hydrogen chloride in ethyl acetate and the resulting 3-(4-chloro-phenyl)-1-(2-imidazolin-2-yl-methyl)-2,3,4,5-tetrahydro-1-benzazepine hydrochloride is filtered off and recrystallized from isopropanol, M.P. 239–241°.

The starting material used in the above procedure is prepared as follows: To a solution of 167 g. of 4-chlorophenyl-acetonitrile in 1000 ml. of a 1:1-mixture of N,N-dimethylformamide and toluene is added in portions 48 g. of a 53 percent suspension of sodium hydride in mineral oil while stirring and cooling in an ice-bath. After the evolution of hydrogen ceases, a solution of 185 g. of 2-phenylethyl bromide in 200 ml. of toluene is added dropwise; the reaction mixture is stirred at room temperature for five hours and allowed to stand for twenty hours. The solvents are removed under reduced pressure; the oily residue is treated with water and the organic material is extracted with diethylether. The organic solution is washed with acetic acid and a saturated solution of sodium chloride in water, dried over sodium sulfate and evaporated to dryness. The resulting 2-(4-chloro-phenyl)-4-phenyl-butyronitrile is purified by distillation and collected at 202°/0.1 mm.; yield: 183 g.

A solution of 183 g. of 2-(4-chloro-phenyl)-4-phenyl-butyronitrile in 720 ml. of 95 percent ethanol is added to 360 g. of sodium hydroxide in 360 ml. of water, and the mixture is heated under reflux for three days. The major portion of the ethanol is distilled off under reduced pressure, and the aqueous portion is made acidic with dilute hydrochloric acid while cooling in an ice bath. The resulting precipitate is extracted with two portions of diethyl ether and one portion of ethyl acetate; the organic solutions are cleared by filtration through a wet layer of a diatomaceous earth preparation, combined and washed with a saturated aqueous solution of sodium chloride, dried over sodium sulfate and evaporated to dryness. The remaining viscous oil crystallizes from a mixture of hexane and pentane to yield 152 g. of 2-(4-chlorophenyl)-4-phenyl-butyric acid, M.P. 82–84°.

To a solution of 153 g. of 2-(4-chloro-phenyl)-4-phenyl-butyric acid in 500 ml. of diethyl ether is added 25 drops of pyridine and dropwise 50 ml. of thionyl chloride while stirring and cooling in an ice-bath. The reaction mixture is then refluxed for thirty minutes, and the diethyl ether is stripped off. The residue is diluted with 50 ml. of benzene and the solvent is evaporated under reduced pressure; this procedure to remove the unreacted thionyl chloride is repeated three times.

The residue is then taken up into 500 ml. of benzene and, while stirring and cooling in an ice-bath, the solution is treated dropwise with a mixture of 75 ml. of stannic chloride in 100 ml. of benzene. The reaction mixture is then allowed to warm to room temperature and is stirred for one hour; after cooling, it is treated dropwise with 500 ml. of 2 N hydrochloric acid while stirring. The organic layer is separated and the aqueous phase is extracted twice with ethyl acetate; the organic solutions are combined, washed five times with an aqueous solution of sodium carbonate, and with an aqueous solution of sodium chloride, dried over sodium sulfate and evaporated to dryness. The resulting 2-(4-chloro-phenyl)-1,2,3,4-tetrahydro-naphthalen-1-one is recrystallized from a mixture of benzene and petroleum ether, M.P. 108–109°; yield: 110 g.

To 100 ml. of glacial acetic acid is added 20.0 g. of 2-(4-chloro-phenyl)-1,2,3,4 - tetrahydro - naphthalen-1-one, followed by 6.6 g. of sodium azide. The resulting reaction mixture is treated with 20 ml. of concentrated sulfuric acid which is added dropwise over a period of ninety minutes while stirring. The reaction mixture is then stirred at room temperature for an additional hour, at 50° for one hour, and again at room temperature for one hour. After standing overnight, the reaction mixture is poured into 500 ml. of water while stirring, whereupon the 3-(4-chloro-phenyl)-2,3,4,5-tetrahydro-1-benzazepin-2-one slowly crystallizes and is filtered off; it melts at 193–195° after recrystallization from ethanol; yield: 8.9 g.

A mixture of 3.8 g. of lithium aluminum hydride in 200 ml. of dry tetrahydrofuran is stirred for fifty minutes at room temperature, and treated with small portions of 9.5 g. of 3-(4-chloro-phenyl)-2,3,4,5-tetrahydro-1-benzazepin-2-one. Stirring is continued for an additional hour, and the reaction mixture is then refluxed for four hours and allowed to stand overnight at room temperature. After slowly adding 8 ml. of water and refluxing for one hour, it is filtered; the filtrate is concentrated under reduced pressure to yield the 3-(4-chloro-phenyl)-2,3,4,5-tetrahydro-1-benzazepine which crystallizes by adding hexane, and is recrystallized from a mixture of ethyl acetate and hexane, M.P. 100–102°; yield: 6.1 g.

To a solution of 4.9 g. of 3-(4-chloro-phenyl)-2,3,4,5-tetrahydro-1-benzazepine in 15 ml. of glacial acetic acid is added 0.55 g. of paraformaldehyde and the reaction mixture is cooled to 15°. A solution of 1.1 g. of sodium cyanide in 5 ml. of water is added dropwise while stirring; after stirring for fifteen minutes at 15°, for one hour at room temperature and for five hours at 50°, and standing at room temperature overnight, the reaction mixture is diluted with water, and the resulting precipitate is filtered off. After two recrystallizations from ethanol, 4.4 g. of 3-(4-chloro-phenyl)-1-cyanomethyl-2,3,4,5-tetrahydro-1-benzazepine of the formula

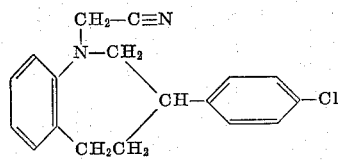

is obtained, melting at 102–104°.

*Example 11*

A mixture of 6.4 g. of 1-cyanomethyl-2-phenyl-1,2,3,4-tetrahydro-quinoline, 2.34 g. of anhydrous ethylenediamine and three drops of carbon disulfide is heated on an oil bath at 130–135° for four hours. The reaction mixture is taken up in about 30 ml. of ethanol; the solvent is evaporated under reduced pressure, to the residue is added approximately 30 ml. of ethyl acetate and the solvent is again evaporated. The residue is then taken up in ethyl acetate; the insoluble material is filtered off, and the filtrate is acidified by adding a solution of anhydrous hydrogen chloride in ethyl acetate. The resulting precipitate is filtered off, and dissolved in water; the solution is made basic with a dilute aqueous solution of sodium hydroxide and the organic material is extracted with ethyl acetate. After drying, the solvent is evaporated under reduced pressure to yield 5.1 g. of 1-(2-imidazolin-2-yl-methyl)-2-phenyl-1,2,3,4-tetrahydro-quinoline of the formula

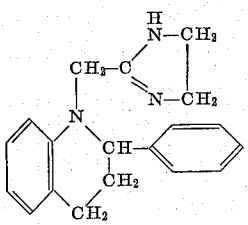

which melts at 138–141°. It is dissolved in ethyl acetate, and treated with hydrogen chloride in ethyl acetate. The resulting 1-(2-imidazolin-2-yl-methyl)-2-phenyl-1,2,3,4-tetrahydro-quinoline hydrochloride is filtered off and recrystallized from a mixture of ethanol and ethyl acetate, M.P. 220°.

The starting material used in the above procedure is prepared as follows: A mixture of 5.5 g. of 2-phenyl-1,2,3,4-tetrahydro-quinoline and 0.78 g. of paraformaldehyde in 14 ml. of glacial acetic acid is cooled to 15° and treated dropwise with 1.5 g. of sodium cyanide in 15 ml. of water while keeping the temperature at 10–20°. After the addition is completed, the reaction mixture is kept at 10–20° for twenty minutes, at 20–25° for twenty-five minutes and at 45–50° for three hours. After cooling to 35–40°, 1.2 ml. of a 37 percent aqueous solution of formaldehyde is added, and the reaction mixture is kept at 35–40° for fifteen minutes and is then allowed to cool, and diluted with 1.4 ml. of water. The supernatant solution is decanted, and the residue is dissolved in benzene. The benzene solution is dried over sodium sulfate, filtered and concentrated to dryness to yield the 1-cyanomethyl-2-phenyl-1,2,3,4-tetrahydro-quinoline of the formula

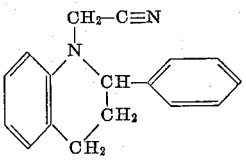

which is isolated as an oil (yield: 6.4 g.) and is used without further purification.

*Example 12*

A mixture of 4.42 g. of 3-(4-chloro-phenyl)-1-cyanomethyl-1,2,3,4-tetrahydro-quinoline, 1.41 g. of anhydrous ethylenediamine and three drops of carbon disulfide is heated for four hours to 120–125°. The excess of ethylenediamine is removed under reduced pressure, and the residue is diluted with 50 ml. of water. After filtering off the aqueous portion, the solid residue is dissolved in ethyl acetate; the organic solution is washed with water, dried and treated with a concentrated solution of hydrogen chloride in ethyl acetate. The resulting 3-(4-chloro-phenyl)-1-(2-imidazolin-2-yl-methyl)-1,2,3,4-tetrahydro-quinoline hydrochloride of the formula

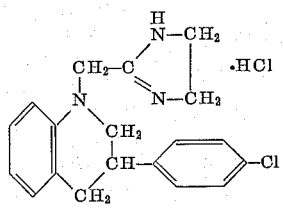

is filtered off, taken up in in 150 ml. of anhydrous ethanol and heated to 80°. After cooling, filtering and drying, the derived product melts at 284–286°; yield: 4.1 g.

The starting material used in the above procedure is prepared as follows: A mixture of 58.5 g. of N-acetyl-glycin, 30.0 g. of fused sodium acetate, 103.6 g. of 4-chloro-benzaldehyde and 134.0 g. of 98 percent of acetic acid anhydride is slowly heated to 115–120°. The temperature is maintained for one hour; the yellow-brown solution is then cooled and filtered, and the solid material is washed with hexane and a small amount of diethyl-ether. The desired 4-(4-chloro-benzal)-2-methyl-2-oxazolin-5-one is recrystallized from ethanol and melts at 142–144°; yield: 72.3 g.

A mixture of 4-(4-chloro-benzal)-2-methyl-2-oxazolin-5-one in 620 ml. of acetone and 240 ml. of water is refluxed for four hours. The organic solvent is evaporated under reduced presure, and the aqueous mixture is cooled to yield the α-acetylamino-4-chloro-cinnamic acid, which is filtered off and washed with a small amount of water and ethanol, M.P. 118–120° (with decomposition); yield: 59.2 g.

A suspension of 57.6 g. of α-acetylamino-4-chloro cinnamic acid in 1,140.0 ml. of 1 N hydrochloric acid is refluxed for three hours. After cooling and filtering of the solid material, the latter is washed with water and dried to yield the 2-(4-chloro-phenyl)-pyruvic acid, which melts at 178.180° (with decomposition); yield: 51.4 g A mixture of 60.1 g. of 2-(4-chloro-phenyl)-pyruvic acid and 44.5 g. of isatin in 260 ml. of concentrated hydrochloric acid is heated to 51° for three hours. While cooling, 120 ml. of concentrated hydrochloric acid is added slowly, and the solid material is filtered off, washed twice with 100 ml. of water, and extracted with a saturated aqueous solution of sodium hydrogen carbonate. The insoluble material is filtered off, the filtrate is acidified and cooled and the precipitate is filtered off. The treatment with the aqueous sodium hydrogen carbonate is repeated to remove the last traces of isatin and to obtain the desired 3-(4-chloro-phenyl)-quinoline 2,4-dicarboxylic acid in pure form, M.P. 172–175° (with decomposition); yield: 63.7 g.

A mixture of 63.7 g. of 3-(4-chloro-phenyl)-quinoline 2,4-dicarboxylic acid and 21.0 g. of copper powder in 360 ml. of a mineral oil preparation is heated to 280° and kept at that temperature for twenty minutes. After cooling to room temperature, 500 ml. of ethyl acetate is added, and the mixture is stirred for one hour and then filtered. A saturated solution of anhydrous hydrogen chloride in ethyl acetate is added to the filtrate to precipitate the 3-(4-chloro-phenyl)-quinoline hydrochloride. The salt is filtered off and converted into the base by adding an aqueous solution of sodium hydroxide to the salt and extracting the base with ethyl acetate. The free 3-(4-chloro-phenyl)-quinoline melts at 133–134° after recrystallization from ethyl acetate; yield: 15.4 g.

A solution of 15.1 g. of 3-(4-chloro-phenyl)-quinoline in 150 ml. of ethanol is treated with hydrogen at a pressure of about 21.5 atmospheres at a temperature of 90°, using Raney nickel as the catalyst. The latter is then filtered off, the filtrate is concentrated, and the residue is dissolved in ethyl acetate. A saturated solution of hydrogen chloride in ethyl acetate is added, the precipitate is filtered off and triturated with 50 ml. of hot ethanol to yield the 3-(4-chloro-phenyl)-1,2,3,4-tetrahydro-quinoline hydrochloride. The free base is obtained by adding a dilute solution of sodium hydroxide in water to the salt, and extracting the 3-(4-chloro-phenyl)-1,2,3,4-tetrahydro-quinoline with ethyl acetate; it melts at 106–108° after crystallization from isopropanol; yield: 3.3 g.

To a mixture of 3-(4-chloro-phenyl)-1,2,3,4-tetrahydroquinoline, 0.65 g. of paraformaldehyde and 11 ml. of glacial acetic acid is added dropwise a solution of 1.26 of sodium cyanide in 4 ml. of water while maintaining a temperature of 15°. The latter is maintained for an additional five minutes, is then raised to room temperature and then to 42–45°, at which level it is kept for three hours. After cooling to 38°, 0.94 ml. of a 37 percent aqueous solution of formaldehyde is added, and the reaction mixture is stirred at 38° for fifteen minutes and then cooled to room temperature. After adding 1.2 ml. of water, the reaction mixture is taken up in benzene, washed with an aqueous solution of sodium hydrogen carbonate and water, dried and concentrated. The crystalline residue is recrystallized from ethyl acetate to yield 4.42 of 3-(4-chloro-phenyl)-1-cyanomethyl-1,2,3,4-tetrahydro-quinoline of the formula

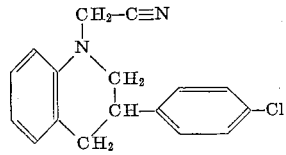

which melts at 132–134°.

*Example 13*

A mixture of 12.7 g. of 3-(3-chloro-phenyl)-1-cyanomethyl-2,3,4,5-tetrahydro-1-benzazepine, 3.9 g. of anhydrous ethylene-diamine and 0.1 ml. of carbon disulfide is slowly heated while stirring to a bath temperature of 90° and kept at this temperature for three hours. After cooling, the reaction mixture is diluted with ethanol and concentrated; the residue is diluted with ethyl acetate, the solvent is evaporated, and ethyl acetate is again added.

The solution is filtered, made acidic with a concentrated solution of hydrogen chloride in ethyl acetate. The 3-(3-chloro-phenyl) - 1 - (2 - imidazolin-2-yl-methyl)-2,3,4,5-tetrahydro-1-benzazepine hydrochloride of the formula

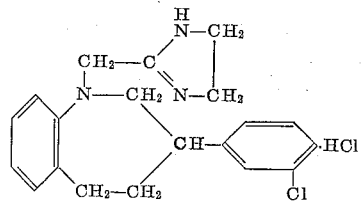

precipitates as a syrup which solidifies and is filtered off and dissolved in warm water. The 3-(3-chloro-phenyl)-1-(2 - imidazolin - 2 - yl - methyl) - 2,3,4,5 - tetrahydro - 1-benzazepine is obtained by adding 2 N aqueous sodium hydroxide and extracting it with ethyl acetate. The organic solution is dried and concentrated (yield: 13.3 g.); the free base is dissolved in ethyl acetate and treated with a solution of hydrogen chloride in ethyl acetate. The desired 3 - (3 - chloro-phenyl)-1-(2-imidazolin-2-yl-methyl),2,3,4,5-tetrahydro-1-benzazepine hydrochloride is recrystallized from isopropanol and then from ethanol, M.P. 241–242°.

The 3-(3-chloro-phenyl)-1-(2-imidazolin-2-yl-methyl)-2,3,4,5-tetrahydro-1-benzazepine picrate is obtained by treating a solution of the free base in ethanol with picric acid in ethanol.

The starting material used in the above procedure is prepared as follows: The 3-(3-chloro-phenyl)-2,3,4,5-tetrahydro-1-benzazepin-2-one is obtained according to the procedure described in Example 10, i.e. by reacting a solution of 82.0 g. of 3-chloro-phenyl-acetonitrile in 250 ml. of N,N-dimethyl-formamide and 125 ml. of toluene with 22.6 g. of a 53 percent suspension of sodium hydride in mineral oil, and then with 90.0 g. of 2-phenylethyl bromide, hydrolizing 92.5 g. of the resulting 2-(3-chloro-phenyl)-4-phenyl-butyronitrile (purified by distillation and recovered at 162–185°/0.03 mm.) with sodium hydroxide in aqueous ethyleneglycol to form the 2-(3-chloro-phenyl)-4-phenyl-butyric acid (B.P. 200–208°/0.1 mm., yield: 83.0 g.), which is converted into its acid chloride by treatment with 65.0 g. of phosphorus pentachloride, and ring-closed by treatment with 46.0 g. of aluminum chloride in 500 ml. of benzene to yield 52 g. of 2-(3-chloro-phenyl)-1,2,3,4-tetrahydro-naphthalen-1-one, M.P. 93°; 48.0 g. of the latter is treated with 16.0 g. of sodium azide in 240 ml. of acetic acid and 48 ml. of sulfuric acid to yield 34.0 g. of the desired 3-(3-chloro-phenyl)-2,3,4,5-tetrahydro-1-benzazepin-2-one, M.P. 204–207°.

A total of 11.4 g. of lithium aluminum hydride is added in portions to 350 ml. of dry tetrahydrofuran, and the mixture is stirred for one hour and is then treated with 27.2 g. of 3-(3-chloro-phenyl)-2,3,4,5-tetrahydro-1-benzazepin-2-one. The reaction mixture is stirred at room temperature for one hour, then refluxed gently for four hours and allowed to stand overnight at room temperature. In the following order, 35 ml. of ethyl acetate, 11.5 ml. of water, 24 ml. of a 15 percent aqueous solution of sodium hydroxide and 35 ml. of water are added and the reaction mixture is stirred for two hours at room temperature. The solid material is filtered off and washed three times with 50 ml. of methylene chloride. The combined filtrate and washings are concentrated under reduced pressure, and the residue is dissolved in ethyl acetate. The organic solution is washed with an aqueous solution of potassium carbonate and with water, dried and evaporated to yield 27.2 g. of the non-crystalline 3-(3-chloro-phenyl)-2,3,4,5-tetrahydro-1-benzazepin, which is used without further purification.

To a solution of 11.6 g. of 3-(3-chloro-phenyl)-2,3,4,5-tetrahydro-1-benzazepine in 30 ml. of acetic acid is added 1.35 g. of paraformaldehyde; the reaction mixture is cooled to 10–12° and treated dropwise with a solution of 2.7 g. of sodium cyanide in 10 ml. of water while stirring.

After stirring at 10–15° for thirty minutes, the reaction mixture is allowed to warm up to room temperature, is stirred for thirty minutes, and then slowly heated to 45° over a period of thirty minutes; it is kept at 45–50° for three hours, and then cooled to 35° and treated with 2.25 ml. of a 37 percent aqueous formaldehyde solution. After stirring for twenty minutes at 35°, the reaction mixture is diluted with 3 ml. of water, cooled to room temperature and allowed to stand overnight. The aqueous layer is decanted from the crude 3-(3-chloro-phenyl)-1-cyanomethyl-2,3,4,5-tetrahydro-1-benzazepine of the formula

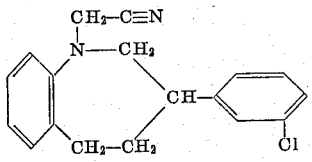

which is dissolved in benzene, washed with an aqueous solution of sodium hydrogen carbonate and water, dried and evaporated; yield: 12.7 g. The desired starting material is used without further purification.

*Example 14*

A solution of 1.7 g. of 3-(2-chloro-phenyl)-1-(2-imidazolin - 2 - yl - methyl) - 2,3,4,5 - tetrahydro - 1 - benzazepine in 5 ml. ethanol is formed by warming the mixture, and is added to a solution of 0.97 g. of glucuronic acid in 5 ml. of water. The resulting solution is concentrated under reduced pressure to remove the ethanol, and the residue is taken up in 35 ml. of tetrahydrofuran. The 3-(2-chloro - phenyl) - 1 - (2 - imidazolin - 2 - yl - methyl)-2,3,4,5-tetrahydro-1-benzazepine glucuronate precipitates, the supernatant liquid phase is decanted and the residue is triturated with another 35 ml. of tetrahydrofuran, then with diethyl ether and with acetone. The crystalline salt is filtered off and dried, M.P. 90° (with foaming); yield: 2.5 g.

*Example 15*

By reacting 1.7 g. of 3-(4-chloro-phenyl)-1-(2-imidazolin - 2 - yl - methyl)-2,3,4,5-tetrahydro-1-benzazepine with 0.97 g. of glucuronic acid according to the procedure described in Example 14, 2.1 g. of the 3-(4-chloro-phenyl) - 1 - (2 - imidazolin - 2 - yl - methyl) - 2,3,4,5 - tetrahydro-1-benzazepine glucuronate is obtained, M.P. 130° (with foaming).

*Example 16*

A solution of 1.72 g. of 3-(4-chloro-phenyl)-1-(2-imidazolin - 2 - yl - methyl) - 2,3,4,5 - tetrahydro - 1 - benzazepine hydrochloride in 40 ml. of water is combined with a solution of 1.1 g. of disodium pamoate. The 3-(4-chloro - pheny) - 1 - (2 - imidazoline - 2 - yl - methyl)-2,3,4,5-tetrahydro-1-benzazepine pamoate (two moles of the base per one mole of the acid) precipitates, is filtered off, washed with water and dried; it begins to melt at 140° without a definite melting point; yield: 2.1 g.

*Example 17*

A mixture of 0.93 g. of 3-(4-chloro-phenyl)-1-(2-imidazolin - 2 - yl - methyl) - 2,3,4,5 - tetrahydro - 1 - benzazepine and 5 ml. of ethanol is warmed to form a solution to which is added 1.0 g. of adenosine-5'-phosphoric acid dissolved in 10 ml. of hot water. The resulting solution is concentrated to dryness under reduced pressure and the residue is triturated with diethylether. The solid adenosine-5'-phosphoric acid salt of 3-(4-chloro-phenyl)-1-(2-imidazolin - 2 - yl - methyl) - 2,3,4,5 - tetrahydro - 1-benzazepine is filtered off; it melts at 160° (with decomposition); yield: 1.8 g.

*Example 18*

Other compounds, which are prepared according to the previously-described and illustrated procedure by selecting the appropriate starting materials (prepared as shown above), are the following compounds:

| Starting Material | Reagents | Product |
| --- | --- | --- |
| 3-(4-chloro-phenyl)-1-cyanomethyl-2,3,4,5-tetrahydro-1-benzazepine. | 1,3-propylenediamine + carbon disulfide. | 3-(4-chloro-phenyl)-1-(1,4,5,6-tetrahydro-2-pyrimidylmethyl)-2,3,4,5-tetrahydro-1-benzazepine. |
| 1-cyanomethyl-3-(4-methyl-phenyl)-2,3,4,5-tetrahydro-1-benzazepine. | 1,2-propylenediamine + carbon disulfide. | 1-[4-methyl-(2-imidazolin-2-yl)-methyl]-3-(4-methyl-phenyl)-2,3,4,5-tetrahydro-1-benzazepine. |
| 8-chloro-1-cyanomethyl-3-(4-methoxy-phenyl)-2,3,4,5-tetrahydro-1-benzazepine. | Ethylenediamine + carbon disulfide. | 8-chloro-1-(2-imidazolin-2-yl-methyl)-3-(4-methoxy-phenyl)-2,3,4,5-tetrahydro-1-benzazepine. |
| 1-cyanomethyl-6-methyl-3-phenyl-1,2,3,4-tetrahydro-quinoline. | do | 1-(2-imidazolin-2-yl-methyl)-6-methyl-3-phenyl-1,2,3,4-tetrahydro-quinoline. |
| 1-cyanomethyl-3-(3-pyridyl)-2,3,4,5-tetrahydro-1-benzazepine. | do | 1-(2-imidazolin-2-yl-methyl)-3-(3-pyridyl)-2,3,4,5-tetrahydro-1-benzazepine. |
| 1-cyanomethyl-2-methyl-3-(3-pyridyl)-2,3,4,5-tetrahydro-1-benzazepine. | do | 1-(2-imidazolin-2-yl-methyl)-2-methyl-3-(3-pyridyl)-2,3,4,5-tetrahydro-1-benzazepine. |
| 1-cyanomethyl-3-methyl-3-(3-pyridyl)-2,3,4,5-tetrahydro-1-benzazepine. | do | 1-(2-imidazolin-2-yl-methyl)-3-methyl-3-(3-pyridyl)-2,3,4,5-tetrahydro-1-benzazepine. |
| 1-cyanomethyl-3-(4-fluoro-phenyl)-1,2,3,4-tetrahydro-quinoline. | do | 1-(2-imidazolin-2-yl-methyl)-3-(4-fluorophenyl)-1,2,3,4-tetrahydro-quinoline. |
| 1-cyanomethyl-2-phenyl-2,3,4,5-tetrahydro-1-benzazepine. | do | 1-(2-imidazolin-2-yl-methyl)-2-phenyl-2,3,4,5-tetrahydro-1-benzazepine. |
| 1-cyanomethyl-3-phenyl-1,2,3,4,5,6-hexahydro-1-benzazepine. | do | 1-(2-imidazolin-2-methyl)-3-phenyl-1,2,3,4,5,6-hexahydro-1-benzazepine. |
| 1-cyanomethyl-3-(4-trifluoromethyl-phenyl)-2,3,4,5-tetrahydro-1-benzazepine. | do | 1-(2-imidazolin-2-yl-methyl)-3-(4-trifluoromethyl-phenyl)-2,3,4,5-tetrahydro-1-benzazepine. |
| 1-cyanomethyl-7,8-dimethoxy-3-phenyl-2,3,4,5-tetrahydro-1-benzazepine. | do | 7,8-dimethoxy-1-(2-imidazolin-2-yl-methyl)-3-phenyl-2,3,4,5-tetrahydro-1-benzazepine. |
| 1-cyanomethyl-3-(3,4-dichloro-phenyl)-2,3,4,5-tetrahydro-1-benzazepine. | do | 3-(3,4-dichlorophenyl)-1-(2-imidazolin-2-yl-methyl)-2,3,4,5-tetrahydro-1-benzazepine. |
| 3-(4-bromo-phenyl)-1-cyanomethyl-2,3,4,5-tetrahydro-1-benzazepine. | do | 3-(4-bromo-phenyl)-1-(2-imidazolin-2-yl-methyl)-2,3,4,5-tetrahydro-1-benzazepine. |

Example 19

Pharmaceutical compositions containing one of the above 1-(R-methyl)-benzoazacycloalkene compounds, in which one of the positions 2 and 3 of the azacycloalkene portion is substituted by Ar, and in which R and Ar have the previously-given meaning, or a pharmaceutically acceptable acid addition salt thereof as the pharmacologically active ingredient, are prepared according to standard procedures. They comprise essentially a pharmacologically effective amount of the active compound and a pharmaceutically acceptable carrier; usually, the carrier represents the major portion of a pharmaceutical preparation, which has essentially of from about 1 percent to at most 90 percent of the active ingredient.

Pharmaceutical compositions for oral use comprise essentially from about 0.01 g. to about 0.1 g. of a 1-(R-methyl)-benzoazacycloalkene compound, one of the positions 2 and 3 of the azacycloalkene portion is substituted by Ar, and in which R and Ar have the previously-given meaning, or a pharmaceutically acceptable acid addition salt thereof as the pharmacologically active ingredient per single dosage unit, and a pharmaceutically acceptable solid carrier.

Tablets, each containing 0.05 g. of 3-(4-chloro-phenyl)-(2 - imidazolin-2-yl-methyl) - 2,3,4,5 - tetrahydro - 1-benzazepine hydrochloride, are prepared as follows (for 100,000 tablets).

Ingredients:  G.
3-(4-chloro-phenyl) - 1 - (2 - imidazolin-
  2 - yl - methyl) - 2,3,4,5 - tetrahydro - 1
  benzazepine hydrochloride _____ 5,000.0
Lactose S.D. _____ 21,369.0
Corn starch _____ 770.0
Corn starch (for paste) _____ 572.0
Confectioners sugar _____ 2,000.0
Stearic acid _____ 289.0
Purified water, q.s.
Alcohol anhydrous 3A, q.s.

The 3 - (4 - chloro-phenyl)-1-(2-imidazolin-2-yl-methyl) 2,3,4,5-tetrahydro-1-benzazepine hydrochloride is mixed with an equal portion of lactose; the mixture is passed through a No. 16 screen on a Fitzmill at medium speed and placed into a mixer. The remainder of the lactose, the 770.0 g. of corn starch, the confectioners sugar and the stearic acid are added, and the powder is mixed for twenty minutes. The 572.0 g. of corn starch is suspended in cold water and a paste is formed by diluting the mixture with 3,000 ml. of boiling water. The paste is then added to the dry powder mixture to form the granulate; granulation is completed by adding 200 ml. of a 1:1-mixture of the 3A alcohol and water. The wet mass is passed through a No. 5 screen on the Fitzmill at low speed, dried on trays at about 43° and then broken on a No. 12 screen. The granulate is compressed into tablets weighing 0.3 g. using 11/32 inch dies and standard concave punches.

Tablets, each containing 0.03 g. of 3-(2-chloro-phenyl) - (2 - imidazolin - 2 - yl - methyl)-2,3,4,5-tetrahydro-1-benzazepine hydrochloride, are prepared as follows (for 100,000 tablets):

Ingredients:  G.
3 - (2 - chloro - phenyl) - 1 - (2-imidazolin-
  2 - yl - methyl) - 2,3,4,5 - tetrahydro-1-
  benzazepine hydrochloride _____ 3,000.0
Lactose, spray dried _____ 23,000.0
Corn starch _____ 770.0
Corn starch (for paste) _____ 572.0
Confectioners sugar _____ 2,000.0
Stearic acid _____ 289.0
Purified water, q.s.
Alcohol anhydrous 3A, q.s.

The tablets are prepared as described before.

Tablets, each containing 0.025 g. of 3-(3-chloro-phenyl) 1 - (2 - imidazolin - 2 - yl - methyl) - 2,3,4,5 - tetrahydro-1-benzazepine hydrochloride, are prepared as follows (for 100,000 tablets):

Ingredients:  G.
3 - (3 - chloro - phenyl) - 1 - (2-imidazolin-
  2 - yl - methyl) - 2,3,4,5 - tetrahydro - 1-
  benzazepine hydrochloride _____ 2,500.0
Lactose, spray dried _____ 23,869.0
Corn starch _____ 770.0
Corn starch (for paste) _____ 572.0
Confectioners sugar _____ 2,000.0
Stearic acid _____ 289.0
Purified water, q.s.
Alcohol anhydrous 3A, q.s.

The tablets are prepared according to the procedure described above.

A solution for parenteral administration contains from about 0.01 g./ml. to about 0.1 g./ml. of a 1-(R-methyl) benzoazacycloalkene compound, in which one of the positions 2 and 3 of the azacycloalkene portion is substituted by Ar, and in which R and Ar have the previously-given meaning, or a pharmaceutically acceptable acid addition salt thereof as the pharmacologically active ingredient, together with a pharmaceutically acceptable liquid carrier.

A solution for injection, containing 0.02 g./ml. of 1-(2 - imidazolin - 2 - yl - methyl) - 3 - phenyl - 1,2,3,4-tetrahydro-quinoline hydrochloride, is prepared as follows (for 1,000 ml.):

Ingredients:
1 - (2 - imidazolin - 2 - yl - methyl) - 3-
  phenyl - 1,2,3,4 - tetrahydro - quinoline
  hydrochloride _____G___ 20.00
Sodium chloride _____do__ 7.07
Water for injection, q.s. _____ml__ 1,000.00

The 1 - (2 - imidazolin - 2 - yl - methyl) - 3 - phenyl-1,2,3,4-tetrahydro-quinoline hydrochloride is dissolved in 950 ml. of water for injection, the solution is heated to 40°, and the sodium chloride is added. The solution is cooled to 25°, and the volume is brought to 1,000.00 ml. by adding the necessary amount of water. Throughout the procedure aseptic techniques are used, and the solution is filtered through a sterile filter into a 2,000 ml. flask, and 2.2 ml. of the solution is filled into 2 ml. amber ampules which are sealed and inspected.

In the above solution, the 1-(2-imidazolin-2-yl-methyl) 3-phenyl-1,2,3,4-tetrahydro-quinoline hydrochloride may by replaced by 3-(3-chloro-phenyl)-1-(2-imidazolin-2-yl-methyl)-2,3,4,5-tetrahydro-1-benzazepine hydrochloride, 3 - (4 - chloro - phenyl) - 1 - (2 - imidazolin - 2 - yl-methyl)-2,3,4,5 - tetrahydro - 1 - benzazepine hydrochloride and the like.

What is claimed is:

1. A member selected from the group consisting of a compound having one of the formulae

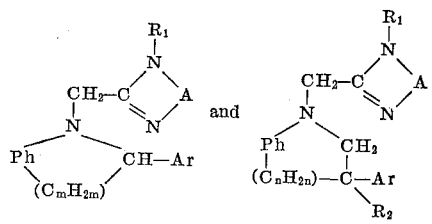

in which Ph is a member selected from the group consisting of 1,2-phenylene, (lower alkyl)-1,2-phenylene, (lower alkoxy)-1,2-phenylene, (halogeno) - 1,2 - phenylene and (trifluoromethyl)-1,2-phenylene, Ar is a member selected from the group consisting of phenyl, (lower alkyl)-phenyl, (lower alkoxy)-phenyl, (halogeno)-phenyl and (trifluoromethyl)-phenyl, each of the groups $R_1$ and $R_2$ is a member selected from the group consisting of hydrogen and lower alkyl, the group of the formula —($C_mH_{2m}$)— is lower alkylene separating the group Ph from the carbon atom carrying the group Ar by two to four carbon atoms, the group of the formula —($C_nH_{2n}$)— is lower alkylene separating the group Ph from the carbon atom carrying the groups Ar and $R_2$ by at most three carbon atoms and A is lower alkylene separating the two nitrogen atoms by two to four carbon atoms, and a non-toxic acid addition salt thereof.

2. A member selected from the group consisting of a compound having the formula

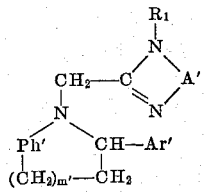

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, the group Ar' is a member selected from the group consisting of phenyl, (lower alkyl)-phenyl, (lower alkoxy)-phenyl, (halogeno) phenyl, and (trifluoromethyl)-phenyl, the letter $m'$ is one of the integers selected from the group consisting of 1 and 2, A' is alkylene having from two to three carbon atoms and separating the two nitrogen atoms by from two to three carbon atoms, and $R_1$ is a member selected from the group consisting of hydrogen and lower alkyl, and a non-toxic acid addition salt thereof.

3. A member selected from the group consisting of a compound having the formula

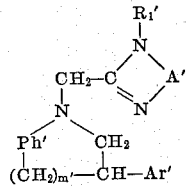

in which Ph' is a member selected from the group consisting of 1,2-phenylene, (lower alkyl)-1,2-phenylene, (lower alkoxy)-1,2-phenylene, (halogeno)-1,2-phenylene and (trifluoromethyl)-1,2-phenylene, the group Ar' is a member selected from the group consisting of phenyl, (lower alkyl)-phenyl, (lower alkoxy)-phenyl, (halogeno) phenyl, and (trifluoromethyl)-phenyl, the letter $m'$ is one of the integers selected from the group consisting of 1 and 2, A' is alkylene having from two to three carbon atoms and separating the two nitrogen atoms by from two to three carbon atoms, and $R_1$ is a member selected from the group consisting of hydrogen and lower alkyl, and a non-toxic acid addition salt thereof.

4. A member selected from the group consisting of 1 - (2 - imidazolin - 2 - yl - methyl) - 3 - phenyl - 2,3,4,5-tetrahydro-1-benzazepine, and a non-toxic acid addition salt thereof.

5. A member selected from the group consisting of 3 - (4 - chloro - phenyl) - 1 - (2 - imidazolin - 2 - yl-methyl) - 2,3,4,5 - tetrahydro - 1 - benzazepine, and a non-toxic acid addition salt thereof.

6. A member selected from the group consisting of 1 - (2 - imidazolin - 2 - yl - methyl) - 3 - phenyl - 1,2,3,4-tetrahydro-quinoline, and a non-toxic acid addition salt thereof.

7. A member selected from the group consisting of 3 - (4 - chloro - phenyl) - 1 - (2 - imidazolin - 2 - yl-methyl)-1,2,3,4-tetrahydro - quinoline, and a non-toxic acid addition salt thereof.

8. A member selected from the group consisting of 1 - (2 - imidazolin - 2 - yl - methyl) - 2 - phenyl - 1,2,3,4-tetrahydro-quinoline, and a non-toxic acid addition salt thereof.

9. A member selected from the group consisting of 3 - (2 - chloro - phenyl) - 1 - (2 - imidazolin - 2 - yl-methyl)-2,3,4,5-tetrahydro - 1 - benzazepine, and a non-toxic acid addition salt thereof.

10. A member selected from the group consisting of 3 - (3 - chloro - phenyl) - 1 - (2 - imidazolin - 2 - yl-methyl)-2,3,4,5-tetrahydro-1-benzazepine, and a non-toxic acid addition salt thereof.

References Cited
UNITED STATES PATENTS

| | | | |
|---|---|---|---|
| 2,569,415 | 9/1951 | Hartmann | 260—309.6 |
| 2,808,413 | 10/1957 | Schindler et al. | 260—309.6 |
| 3,055,883 | 9/1962 | Mull | 260—239 |
| 3,093,632 | 6/1963 | Mull | 260—239 |
| 3,096,334 | 7/1963 | Steck | 260—286 |
| 3,210,372 | 10/1965 | Werner et al. | 260—309.6 |

OTHER REFERENCES

Burger: Medicinal Chemistry, Interscience (1960), pp. 42–43.

ALEX MAZEL, *Primary Examiner.*

HENRY R. JILES, NICHOLAS S. RIZZO, *Examiners.*

D. G. DAUS, A. D. ROLLINS, *Assistant Examiners.*

UNITED STATES PATENT OFFICE
CERTIFICATE OF CORRECTION

Patent No. 3,332,951                                                     July 25, 1967

Alberto Pietro Arnoldo Rossi et al.

It is certified that error appears in the above identified patent and that said Letters Patent are hereby corrected as shown below:

Column 2, line 63, cancel "one". Column 7, second formula, lines 35 to 41, the formula should appear as shown below:

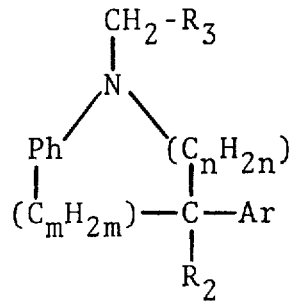

Column 15, line 41, "above 2-" should read -- above 3- --.
Column 18, line 2, "15 ml." should read -- 5 ml. --. Columns 21 and 22, in the table, first column, line 23 thereof, "benzazepine" should read -- benzazecine --; same table, third column, line 28 thereof, "benzazepine" should read -- benzazecine --.

Signed and sealed this 20th day of January 1970.

(SEAL)
Attest:

EDWARD M. FLETCHER, JR.                             WILLIAM E. SCHUYLER, JR.
Attesting Officer                                            Commissioner of Patents